US006438271B1

(12) United States Patent
Usami et al.

(10) Patent No.: US 6,438,271 B1
(45) Date of Patent: *Aug. 20, 2002

(54) IMAGE READING APPARATUS

(75) Inventors: Akihiro Usami, Yokohama; Yoshinori Ito, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,143

(22) Filed: Jul. 6, 1998

(30) Foreign Application Priority Data

Jul. 15, 1997 (JP) ............................................. 9-189856

(51) Int. Cl.⁷ .................................................. G06K 9/40
(52) U.S. Cl. ...................... 382/274; 382/167; 382/169; 382/319
(58) Field of Search ................................. 382/312, 314, 382/167, 169, 315, 317, 318, 319, 321, 322, 323, 324, 274; 348/282, 497; 358/474, 471, 480, 481, 482, 483, 486, 505, 509, 475; 250/205, 208.1

(56) References Cited

U.S. PATENT DOCUMENTS

| | | | |
|---|---|---|---|
| 4,677,495 A | 6/1987 | Ito et al. ...................... 358/285 |
| 4,823,195 A | 4/1989 | Ito .............................. 358/285 |
| 4,979,135 A * | 12/1990 | Moy ..................... 364/571.01 |
| 5,032,712 A | 7/1991 | Ito ........................... 250/208.1 |
| 5,125,047 A | 6/1992 | Ito et al. ....................... 382/65 |
| 5,151,796 A | 9/1992 | Ito et al. ..................... 358/461 |
| 5,485,284 A | 1/1996 | Shono et al. ............... 358/504 |
| 5,495,329 A * | 2/1996 | Anderson, II et al. ....... 356/218 |
| 5,513,018 A * | 4/1996 | Nisimura .................... 358/474 |
| 5,523,562 A * | 6/1996 | Maple ......................... 250/235 |
| 5,926,560 A * | 7/1999 | Ichinose et al. ............ 382/162 |
| 5,953,133 A * | 9/1999 | Fujimiya et al. ............ 358/474 |
| 6,009,215 A * | 12/1999 | Yamada ...................... 382/321 |
| 6,023,537 A * | 2/2000 | Wada et al. ................. 382/312 |
| 6,222,647 B1 * | 4/2001 | Tadenuma et al. .......... 358/475 |

* cited by examiner

Primary Examiner—Phuoc Tran
Assistant Examiner—Ali Bayat
(74) Attorney, Agent, or Firm—Fitzpatrick, Cella, Harper & Scinto

(57) ABSTRACT

Two or more original illumination units are mounted on an image reading apparatus. In reading a patched original, an image read while being illuminated along one direction is compared with an image read while being illuminated along another direction or along two directions including the one direction and another direction. In accordance with an image data difference between the two images, image processing or illumination light amount changing is performed to erase shades to be caused by a patched portion of the original.

9 Claims, 21 Drawing Sheets

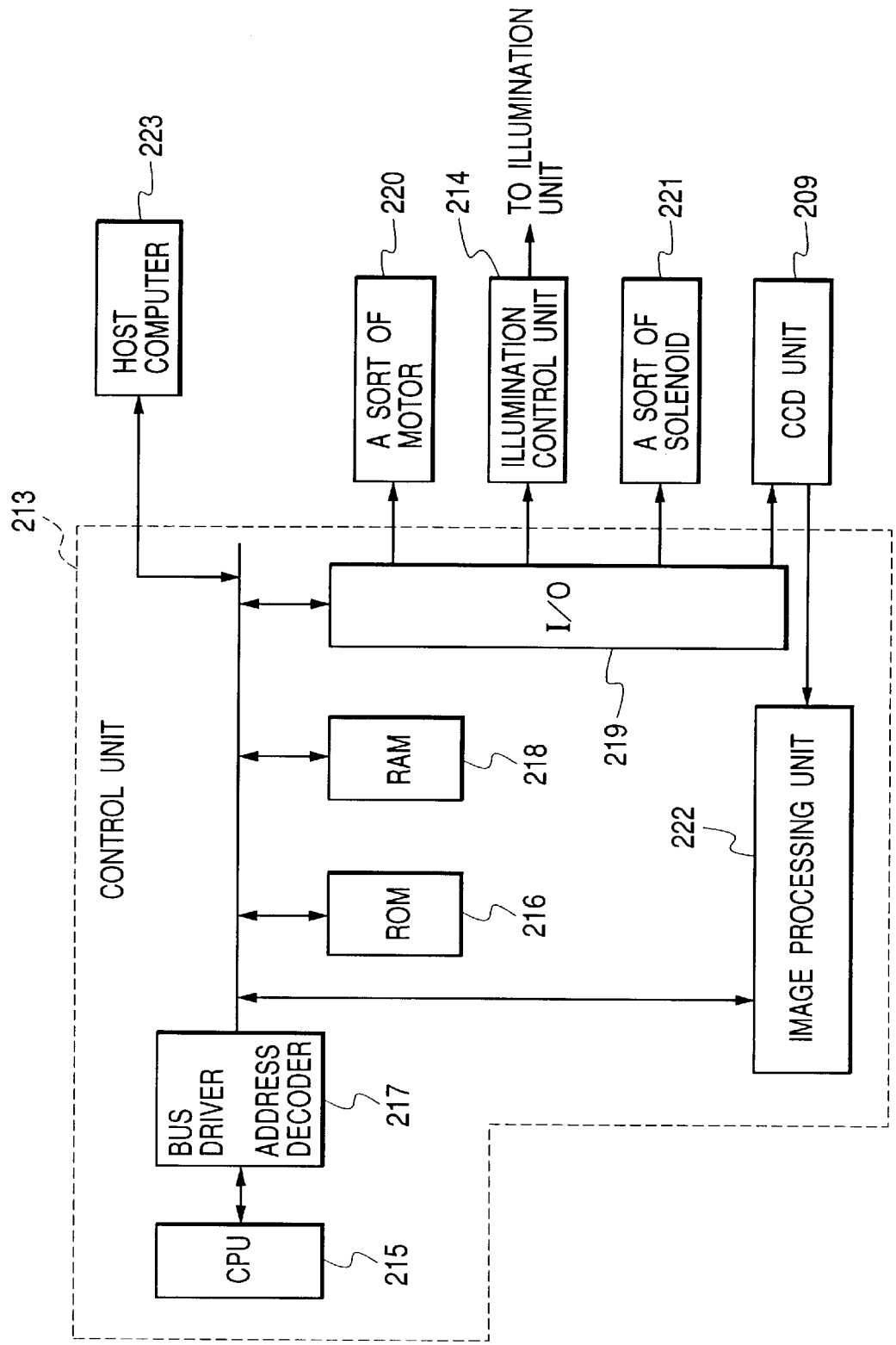

TO MIRROR OR LENS

TO MIRROR OR LENS

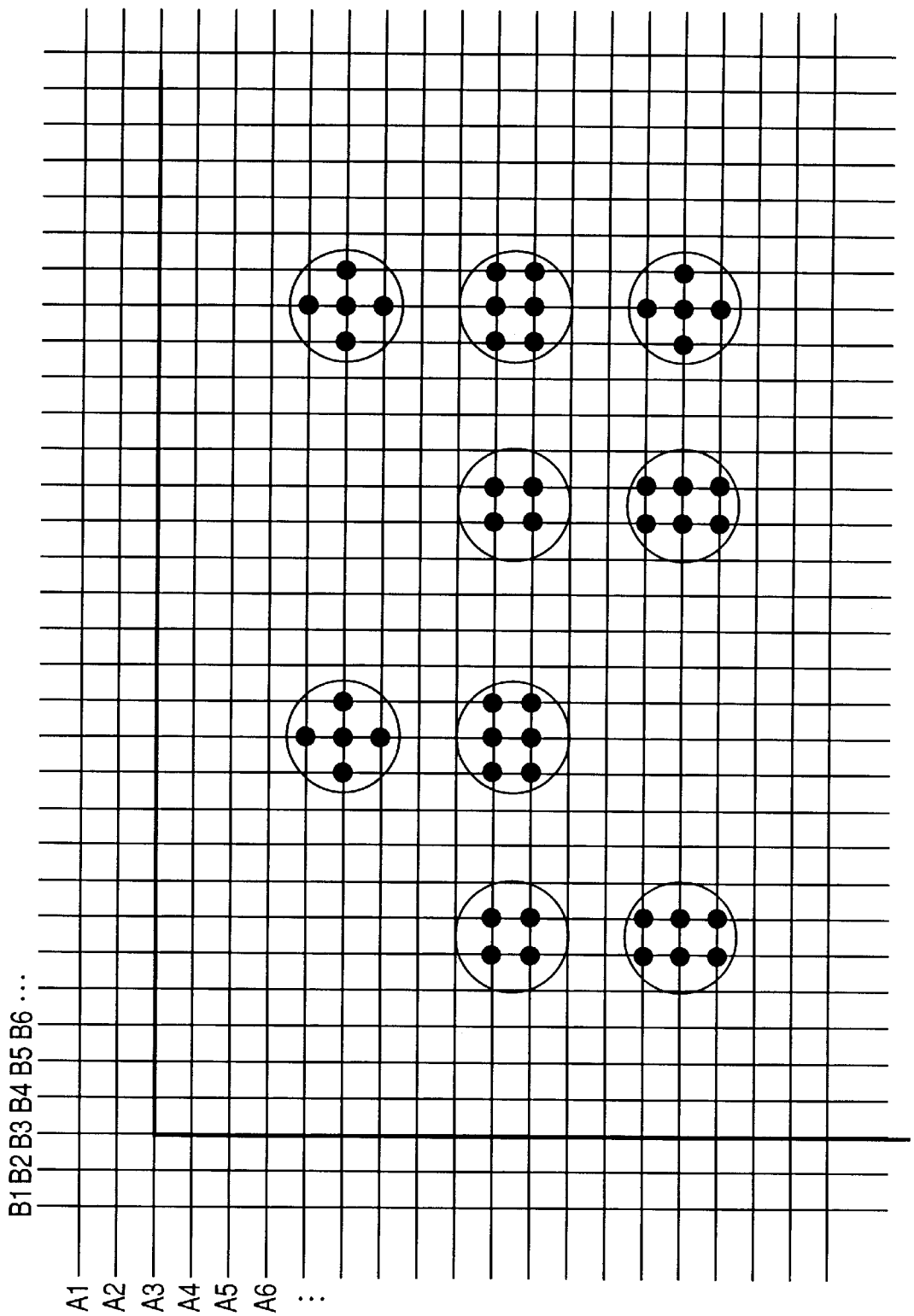

FIG. 21

FIG. 27A
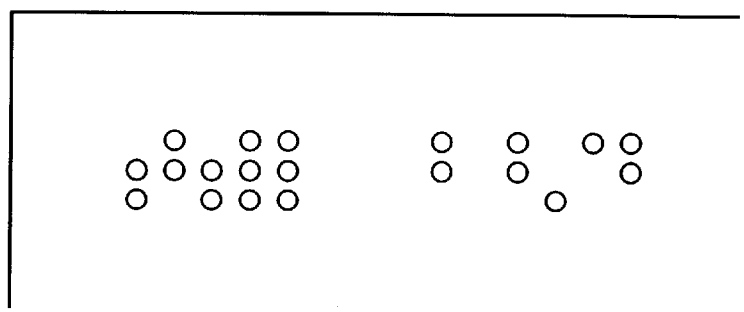
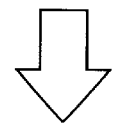
FIG. 27B
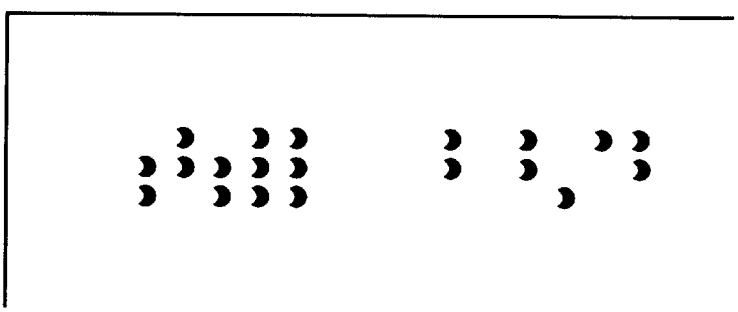
FIG. 28
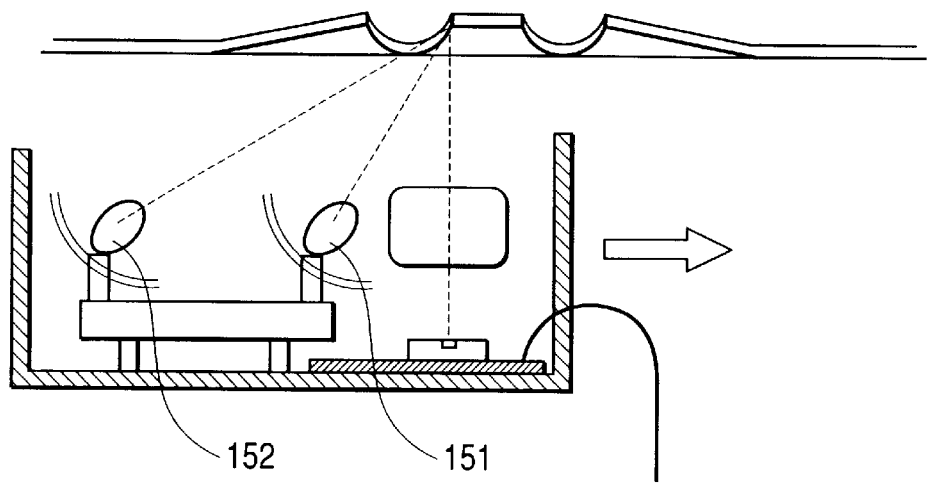

IMAGE READING APPARATUS

BACKGROUND OF THE INVENTION

1. Field of the Invention

The present invention relates to an image reading apparatus such as a scanner for reading an original on which images are recorded.

2. Related Background Art

An illumination apparatus of a conventional image reading apparatus such as a scanner has been designed to equalize the intensities of light from both the upstream and downstream sides of an original (5:5 illumination) in order to erase shades to be caused by an original illumination direction when a patched original is read.

FIG. 13 illustrates the principle of illumination. An original 201 has a patched original 202 pasted thereon. This original 201 is placed on a glass mount 203 and illuminated with two illumination units 204 and 205 from a lower position along opposite directions. In this case, although illumination with the illumination unit 205 does not produce a shade on the right side of the patched original, illumination with the illumination unit 204 produces a shade 206 on the original 201 because of the presence of the patched original 202.

To avoid this, a highlight area of an image has been conventionally set rather dark by image processing or the like to erase shades from the image, or in a copier machine, the highlight area of an image has been conventionally set rather dark by an image forming process to erase shades.

However, recently, user requirements for the reproduction of a highlight area with an image reading apparatus are becoming severe, and even the highlight area is desired to be reproduced with fidelity. However, if an apparatus is designed to reproduce even the highlight area, shades are produced when a patched original or the like is read. With conventional techniques, the reproduction of highlight areas and the erasure of shades are contradictory with each other.

An image forming apparatus is prevailing which reads an image of an original with an optical sensor and the read image of the original is subjected to various image processing to record it on a recording sheet. However, although a conventional image forming apparatus can optically read color information recorded on an original, it cannot read an original with an irregularly raised pattern such as points of braille characters in monochrome color.

SUMMARY OF THE INVENTION

It is an object of the present invention to provide an image reading apparatus capable of satisfying both the reproduction of highlight areas and the erasure of shades.

It is another object of the present invention to provide an apparatus capable of reading irregularly raised pattern information.

According to one embodiment of the invention, an image reading apparatus capable of satisfying both the reproduction of highlight areas and the erasure of shades is provided which comprises illuminating means for illuminating an original recorded with an image along a plurality of directions, reading means for optically reading the illuminated original, and controlling means for controlling to the reading means to read the original a plurality of times and controlling the illuminating means in accordance with a sequential number of a reading order.

According to another embodiment of the invention, an irregularly raised pattern reading apparatus is provided which comprises a sheet member placed on an original recording with an irregularly raised pattern and made of a flexible material, and signal generating means for generating an electrical signal corresponding to the irregularly raised pattern reflected upon a surface of the sheet member.

By placing the sheet member on an original recorded with the irregularly raised pattern such as braille characters and three-dimensional lines, it is possible to read the irregularly raised pattern and obtain electrical signals corresponding to the irregularly raised pattern.

According to another embodiment of the invention, an irregularly raised pattern reading apparatus is provided which comprises switch means including a plurality of switches mounted on a surface in contact with an original recorded with an irregularly raised pattern and operated in response to the irregularly raised pattern on the original, the switch means generating an electrical signal in accordance with a state of each of the plurality of switches.

Since a plurality of switches is selectively turned on or off in accordance with the irregularly raised pattern, electrical signals corresponding to the irregularly raised pattern can be obtained.

BRIEF DESCRIPTION OF THE DRAWINGS

FIG. 2 is a block diagram showing the structure of a control unit.

FIG. 19 is a diagram illustrating an example of reading a braille original according to the fourth embodiment.

FIG. 21 is a diagram showing a braille conversion reference.

FIGS. 27A and 27B illustrate the operation of the apparatus of the seventh embodiment, reading a braille original as a binary image.

FIG. 28 shows the structure of an irregularly raised pattern reading apparatus according to an eighth embodiment of the invention.

DETAILED DESCRIPTION OF THE PREFERRED EMBODIMENTS

Figure 1:
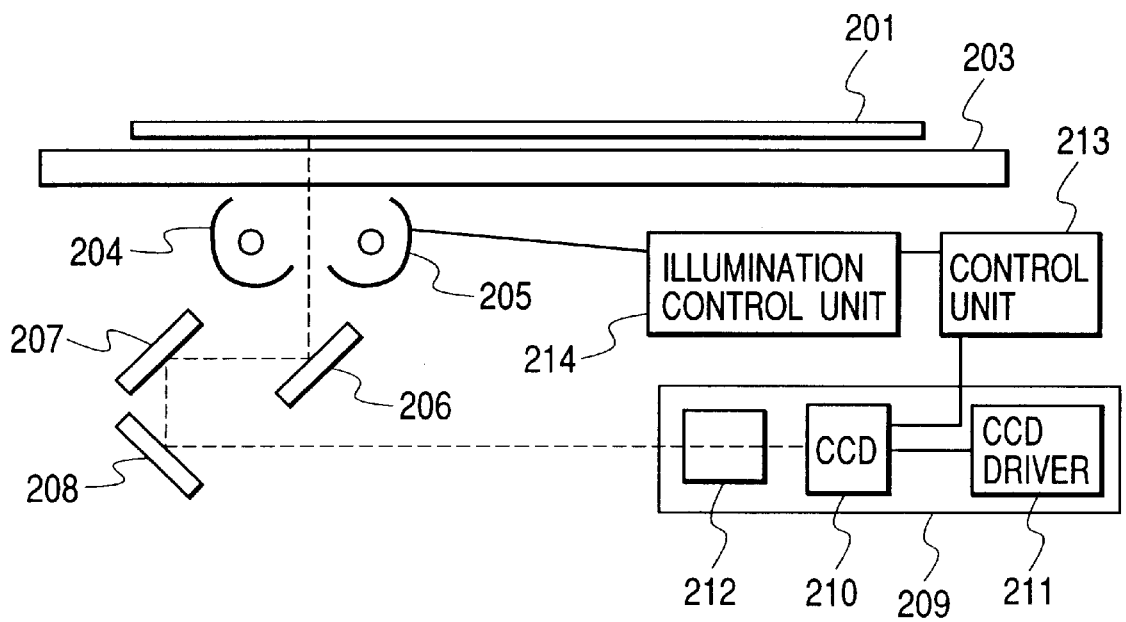
FIG. 1 shows the structure of an image reading apparatus according to a first embodiment of the invention.
Figure 29A:
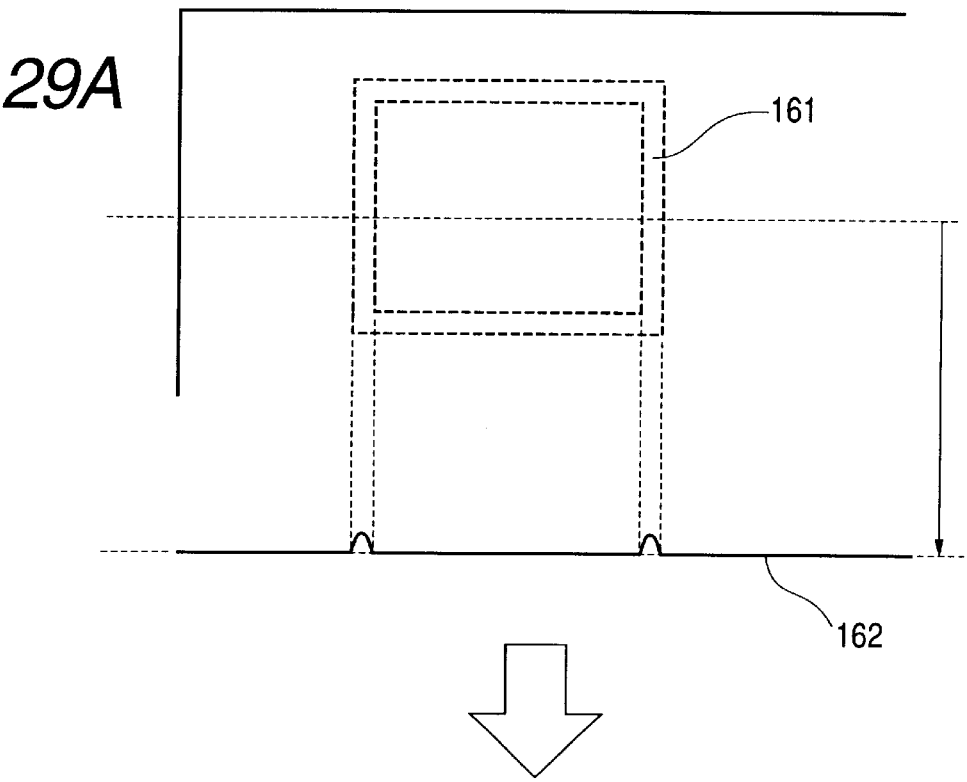
FIGS. 29A and 29B illustrate the operation of forming an image of a geometrical figure constituted of three-dimensional lines.
Figure 29B:
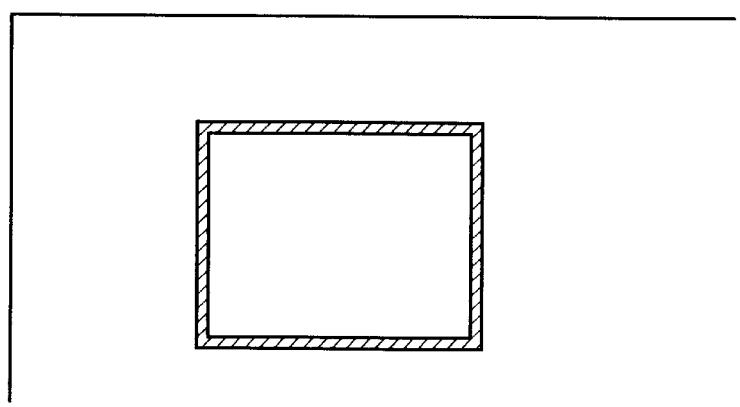

FIG. 1 shows an image reading apparatus according to the first embodiment of the invention. In FIG. 1, elements same as those shown in FIGS. 29A and 29B are represented by using identical reference numerals, and the duplicated description is omitted.

Illumination units 204 and 205 are made of halogen lamps. Reference numerals 206, 207 and 208 represent scanning mirrors which are accommodated in an unrepresented optical scanning unit. As this unit reciprocally moves, light reflected from an original 201 is introduced to a CCD unit 209.

The CCD unit 209 is constituted of a CCD 210 as an image pickup element, a CCD driver 211, and a lens 212 for focussing light reflected from the scanning mirror 208 onto CCD 210. An image signal output from CCD 210 is converted into digital image data of 8 bits and input to a control unit 213. An illumination control unit 214 controls the illumination units 204 and 205 in accordance with an output from the control unit 213.

FIG. 2 shows the structure of the control unit 213. Reference numeral 215 represents a CPU which controls the entirety of the apparatus by sequentially reading and executing a control procedure (control programs) stored in a ROM (read-only memory) 216. Address and data buses of CPU 215 are connected to respective loads via a bus driver and address decoder 217. Reference numeral 218 represents a RAM (random access memory) as a main storage used for storing input data, as working areas and the like. Reference numeral 219 represents an I/O interface which is connected to respective loads including a motor and the like 220 for driving an optical system, the illumination control unit 214, a solenoid and the like 221. Reference numeral 222 represents an image processing unit. An image signal output from the CCD unit 209 is input to this image processing unit 222 which performs image processing to be described later and outputs the results to a host computer 223 and to other units.

Figure 3:
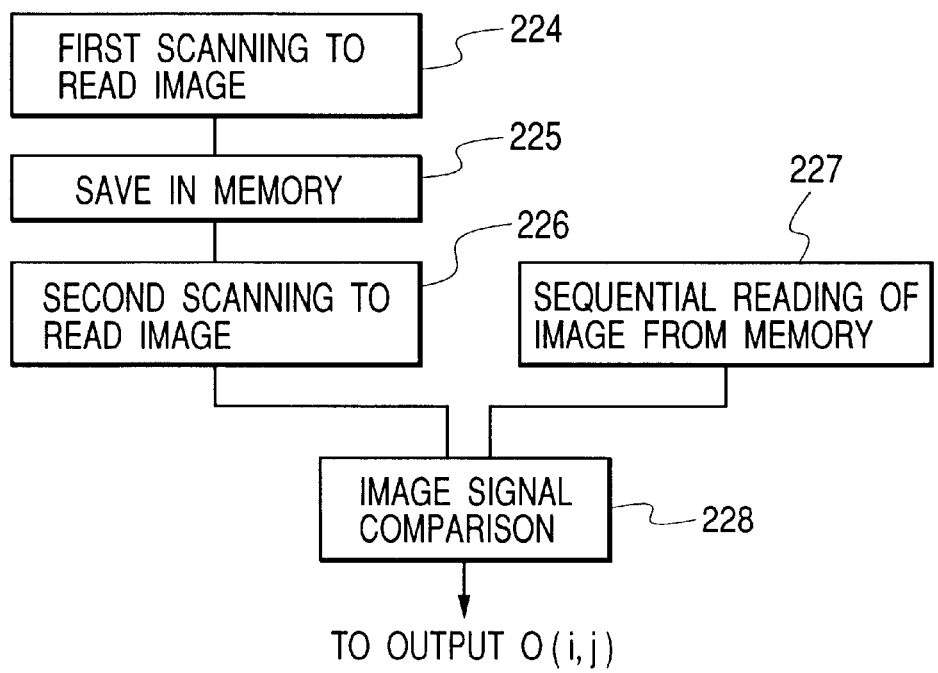
FIG. 3 is a flow chart illustrating an image reading operation.
Figure 4A:
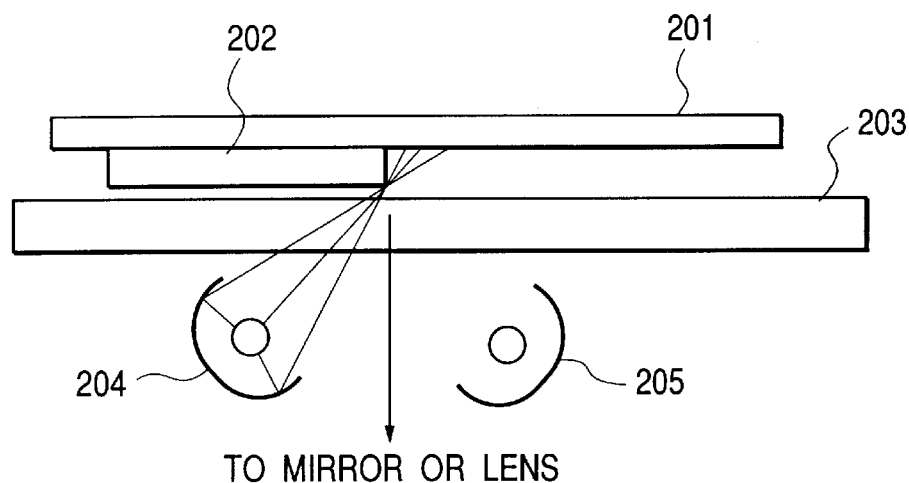
FIGS. 4A and 4B illustrate an operation of reading a patched original.
Figure 4B:
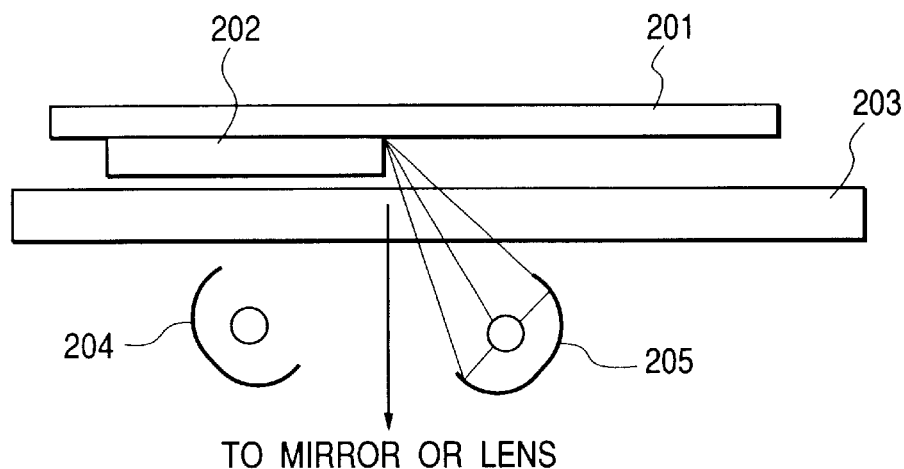
Figure 5:
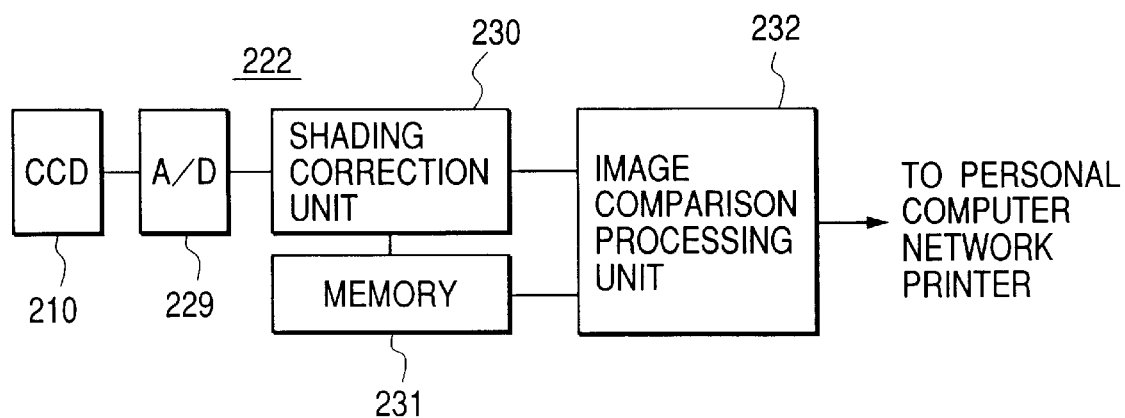
FIG. 5 is a block diagram showing the structure of an image processing unit.

FIG. 3 is a flow chart illustrating the operation of the apparatus of this embodiment, FIGS. 4A and 4B illustrate the operation of reading an original 201 with a patched original 202, and FIG. 5 is a block diagram showing the structure of the image processing unit 222 shown in FIG. 2.

A first original scan is performed at Step 224 shown in FIG. 3. In this case, as shown in FIG. 4A, the original 201 is illuminated only with the illumination unit 204. Light entered CCD 210 during this original scan is converted into an electrical image signal. This image signal is converted by an A/D converter 229 into image data whose uneven illumination or the like of the original is corrected by a shading correction unit 230 and thereafter it is stored in a memory 231 (Step 225).

Next, at Step 226 a second original scan is performed. In this case, as shown in FIG. 4B, the original 201 is illuminated only with the illumination unit 205.

Figure 6A:
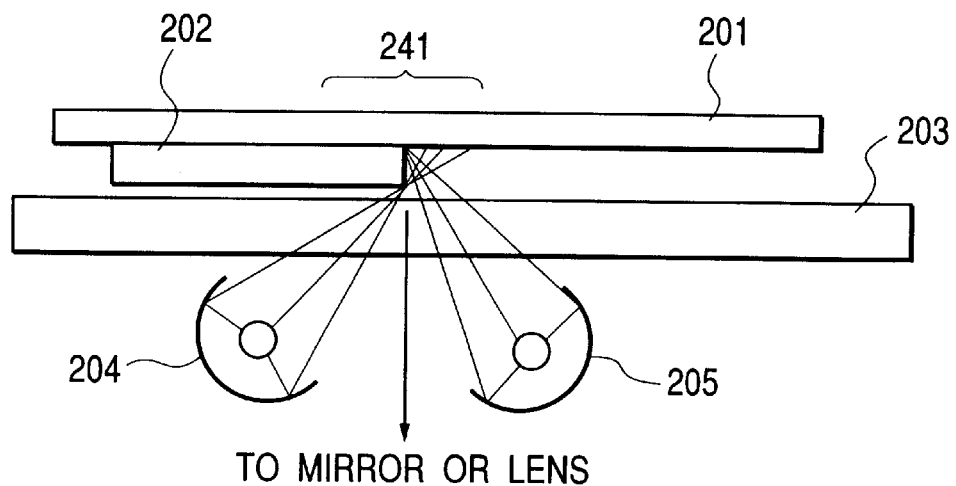
FIGS. 6A and 6B illustrate CCD outputs.
Figure 6B:
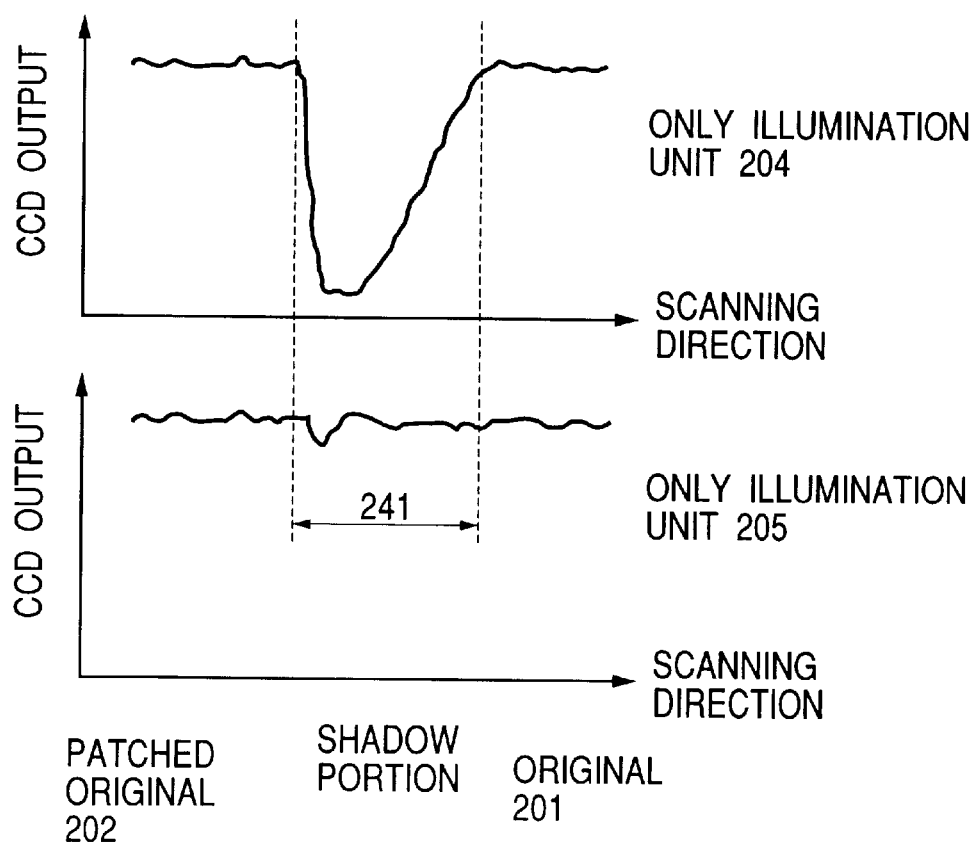

FIGS. 6A and 6B illustrate a difference of an output of CCD 210 between the first and second original scans.

Since the first original scan uses only the illumination unit 204, a CCD output lowers at a shade portion 241, whereas since only the illumination unit 205 is used at the second original scan, no shade is produced.

Figure 7:
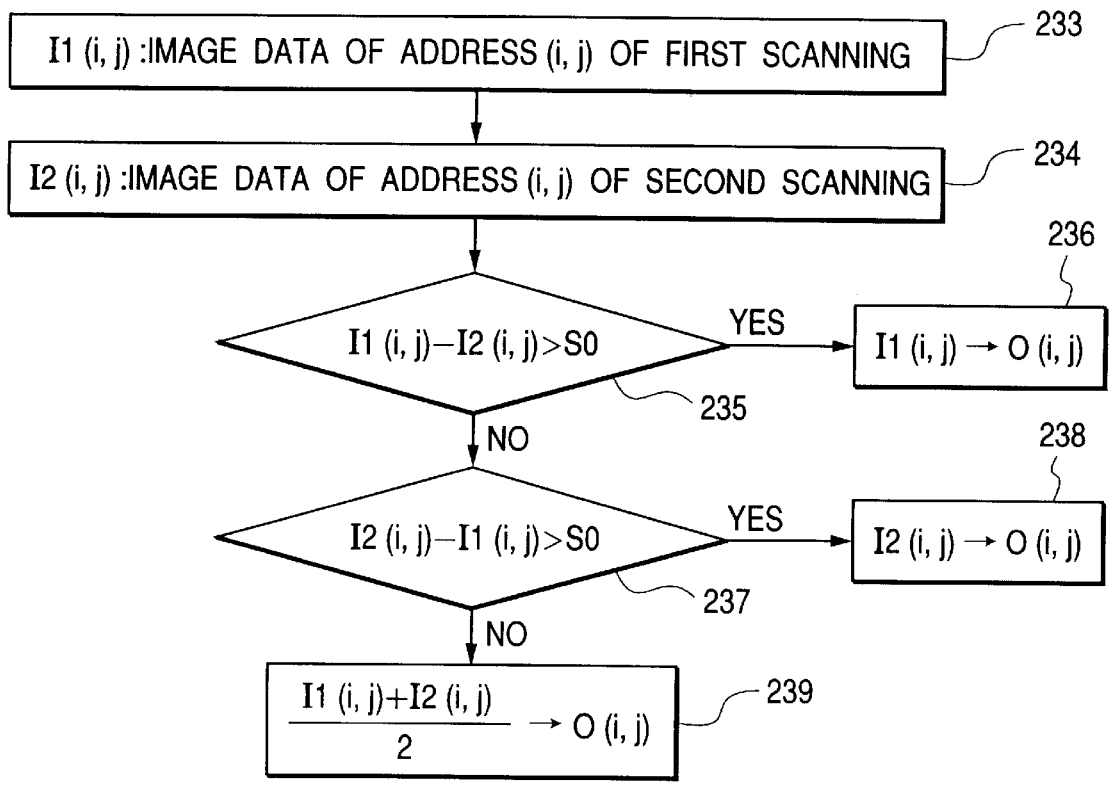
FIG. 7 is a flow chart illustrating the operation by an image comparison unit.

Next, at Step 227, image data stored in a memory 231 is sequentially read and an image comparison processing unit 232 executes the processes illustrated in FIG. 7 which correspond to the processes to be executed by CPU 215 shown in FIG. 2.

I1(i, j) at Step 233 is image data obtained at the first original scan, and I2(i, j) at Step 234 is image data obtained at the second original scan. For example, a white area of the original is I=255, and a black area is I=0. At Step 235 if I1(i, j)−I2(i, j) is larger than a predetermined threshold value S0 (>0), I1(i, j) is used as an output image signal 0(i, j) (Step 236). If I2(i, j)−I1(i, j) is greater than the predetermined threshold value S0 (>0) (Step 237), I2(i, j) is used as the output image signal 0(i, j) (Step 238). If not at Step 237, {I1(i, j)+I2(i, j)}/2 is used as the output image signal 0(i, j) (Step 239). These output image signals are supplied to a personal computer, a network, and a printer.

In the first embodiment, only the illumination unit 205 is used at the second original scan as shown in FIG. 4B. In the second embodiment of the invention, both the illumination units 204 and 205 are used at the second original scan. In this case, the processes shown in FIG. 7 may be used.

Figure 8:
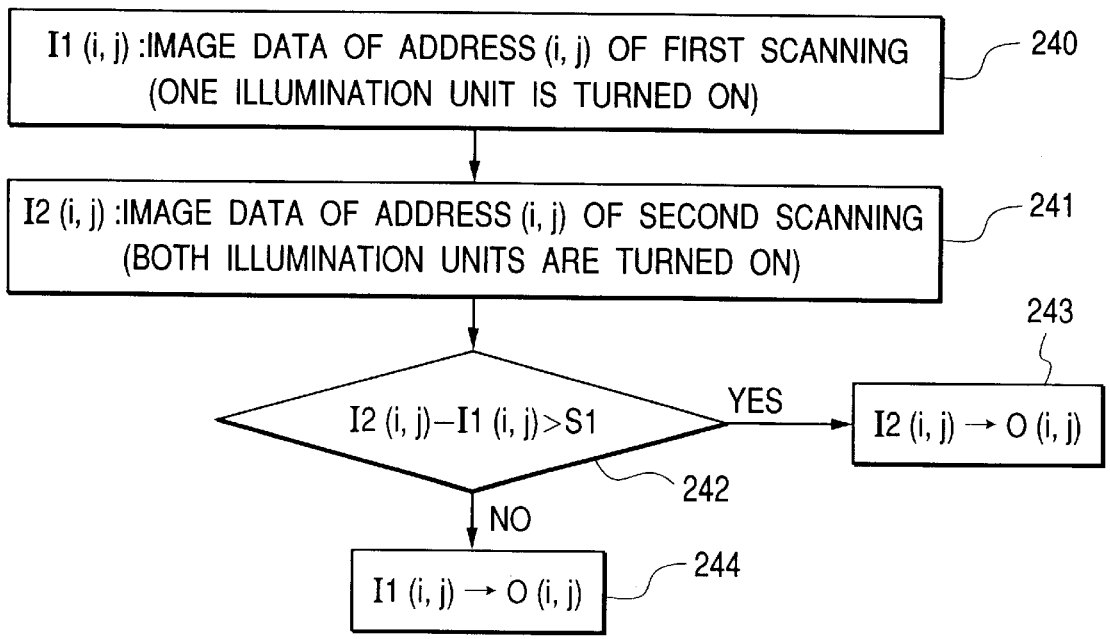
FIG. 8 is a flow chart illustrating the operation of an image comparison unit according to a second embodiment of the invention.

However, since the light amount by one illumination unit is a half that by both the illumination units, an S/N ratio may become poor (a white area of the original with one and both illumination units takes the same signal, for example, 255 of 8 bits, because of the shading correction). In such a case, the image signal obtained with both the illumination units may be used as illustrated in FIG. 8.

At Steps 240 and 241, the first and second original scans are performed to obtain image data. Next, at Step 242, a difference between the image data is compared with a threshold value S1. This threshold value S1 may take a negative value when noises are considered.

If a difference of I2(i, j)−I1(i, j) is larger than Si, I2(i, j) is used as the output image signal 0(i, j) (Step 243), whereas if not, I1(i, j) is used as the output image signal 0(i, j) (Step 244).

In the first and second embodiments, shades are erased by image processing. In the third embodiment of the invention, shades are erased by controlling an illumination light amount applied to an original. In this embodiment, the third original scan is performed. In this third original scan, the illumination control unit 214 shown in FIG. 1 increases the light amount of the illumination unit which does not produce shades at a shade position identified by the shade information obtained in the first and second embodiments.

Figure 9:
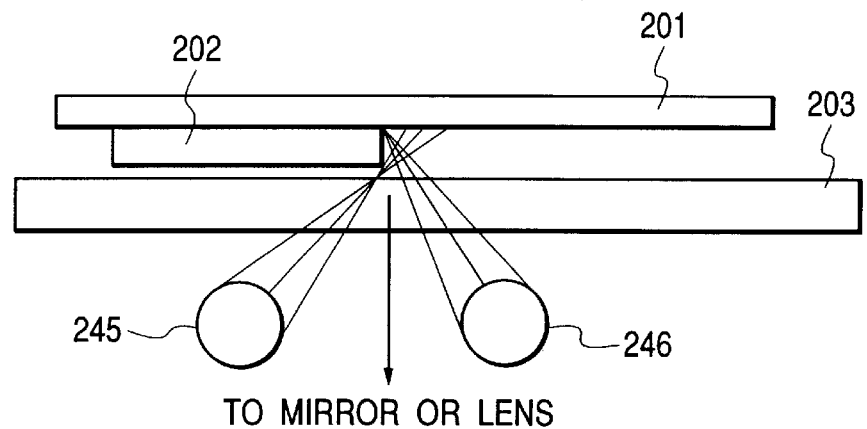
FIG. 9 shows the structure of illumination units according to a third embodiment of the invention.
Figure 10:
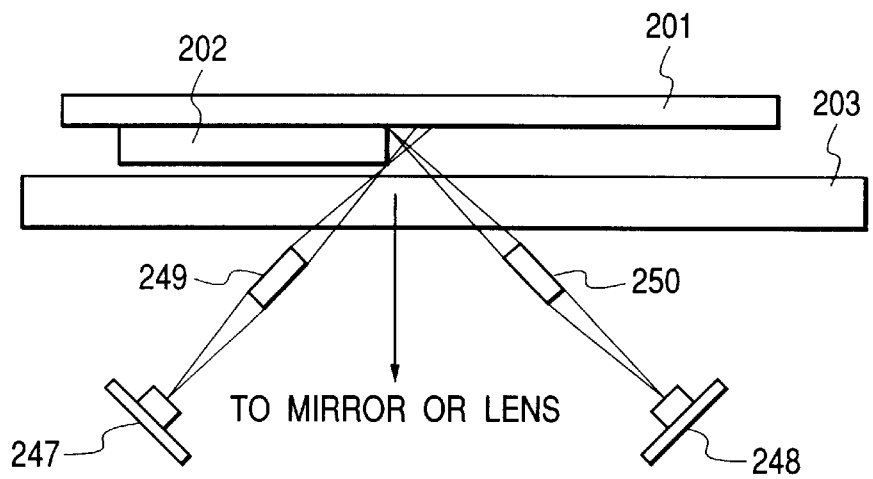
FIG. 10 shows another structure of the illumination units of the third embodiment.

Instead of using a halogen lamp as the illumination unit, fluorescent lamps 245 and 246 may be used as shown in FIG. 9, or LED arrays 247 and 248 in combination with short focal length lens arrays 249 and 250 may also be used as shown in FIG. 10. In the case of fluorescent lamps and LED arrays, the fluorescent lamps 245 and 246 shown in FIG. 9 and the LED arrays 247 and 248 shown in FIG. 10 can be alternately turned on by synchronizing the CCD storage time with an illumination time.

Figure 11:
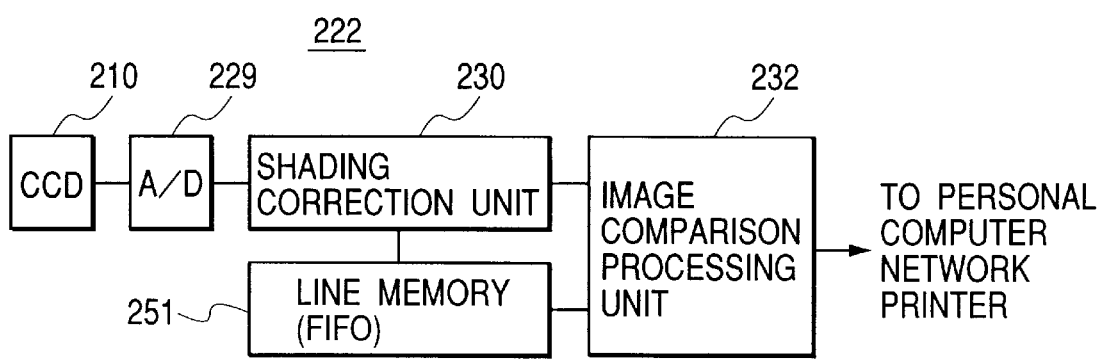
FIG. 11 is a block diagram showing the structure of an image processing unit.

In this case, the image processing unit 222 has the structure as shown in FIG. 11. As shown, the memory 231 shown in FIG. 5 may be replaced by a line memory 251 such as a FIFO, resulting in a low cost.

If a color image reading apparatus is used, the operations similar to the above are performed for each of RGB signals.

Figure 12:
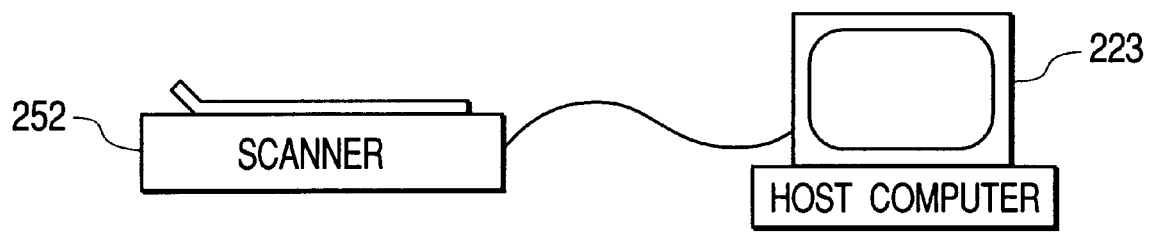
FIG. 12 shows the connection between a scanner and a host computer.
Figure 13:
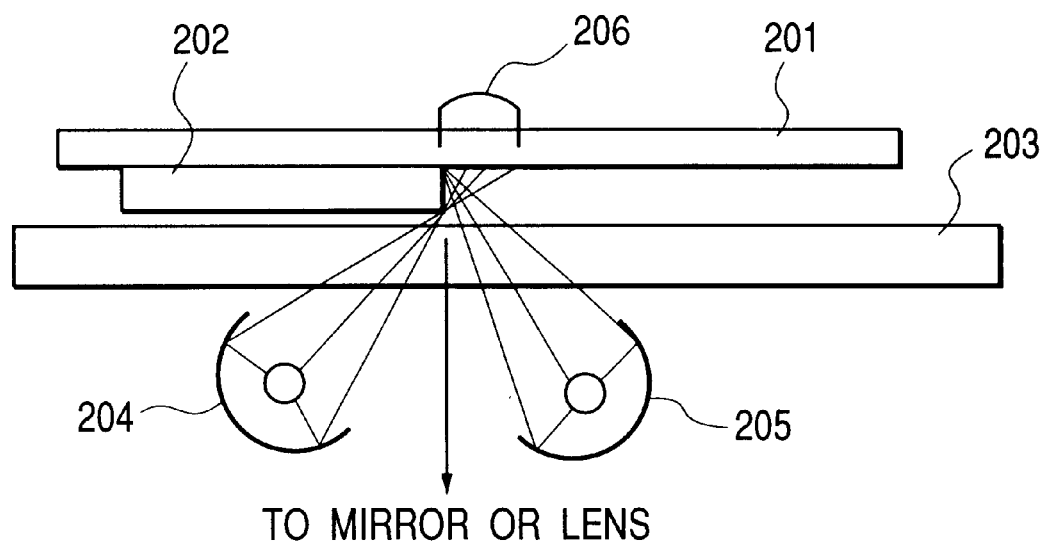
FIG. 13 shows the structure of a conventional image reading apparatus.

For the shade erasure, as shown in FIG. 12, image data of two sheets obtained by illumination in opposite directions may be read with a scanner 252 and supplied to a host computer 223 which in turn executes the processes shown in FIGS. 7 and 8.

Figure 14:
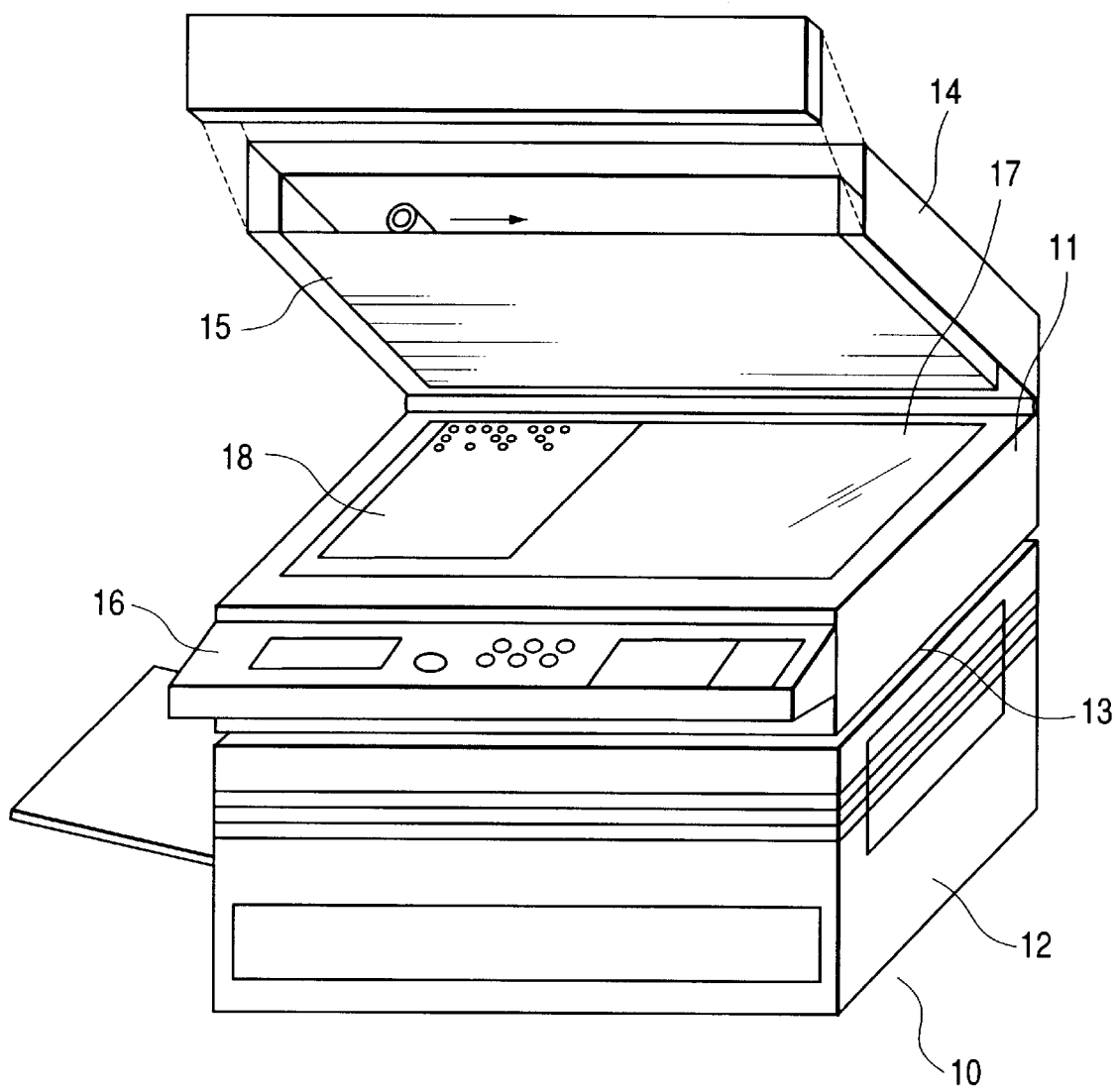
FIG. 14 is a perspective view of an image forming apparatus according to an embodiment of the invention.

FIG. 14 shows an image forming apparatus according to the fourth embodiment of the invention. This image forming apparatus shown as a perspective view in FIG. 14 is a digital copier equipped with a braille original reading apparatus.

The digital copier 10 is constituted of mainly two parts.

The first main part is an image scanner 11 (hereinafter abbreviated as "reader") mounted on an upper region of the copier, the reader reading an original and outputting digital image data. The reader 11 has therein a controller 13 which performs various image processing of the digital image data, controls the reader 11 itself and a printer 12 to be described later, and interfaces with external apparatuses. The reader 11 has an original cover 14 functioning as a lid for pressing an original placed on an original glass mount 17.

The second main part is the printer 12 mounted under the reader 11, the printer 12 printing an image on a recording sheet in accordance with the digital image data supplied from the controller 13.

If an original 18 is a normal image original, it is placed on the original glass mount 17 with its image surface facing the mount 17. The printer 12 has a mechanism under the original glass mount 17, the mechanism reading image data with an unrepresented optical sensor. If the original is a braille original, it is placed directing the braille surface upward. The reader 11 has a mechanism of reading irregularly raised pattern data on the original with an irregularly raised pattern reader 15 which is mounted on the original glass mount 17 side of the original cover 14.

On one side of the reader 11, an operation unit 16 is mounted being connected to the controller 13. A user enters various information, operation commands and the like via the operation unit 16 into the copier. In accordance with the information entered from the operation unit 16, the controller 13 controls the operations of the reader 11 and printer 12.

Also entered by a user from the operation unit 16 to the controller 13 is a command for switching a normal mode of reading a normal original with color images formed on the recording medium to a braille mode of reading a braille original formed with irregularly raised patterns.

The printer 12 may be an ink jet printer having an ink jet recording head, an electrophotographic laser printer or the like, which can print image data supplied from the controller 13 on a recording medium such as a recording sheet and an OHP sheet.

Figure 15:
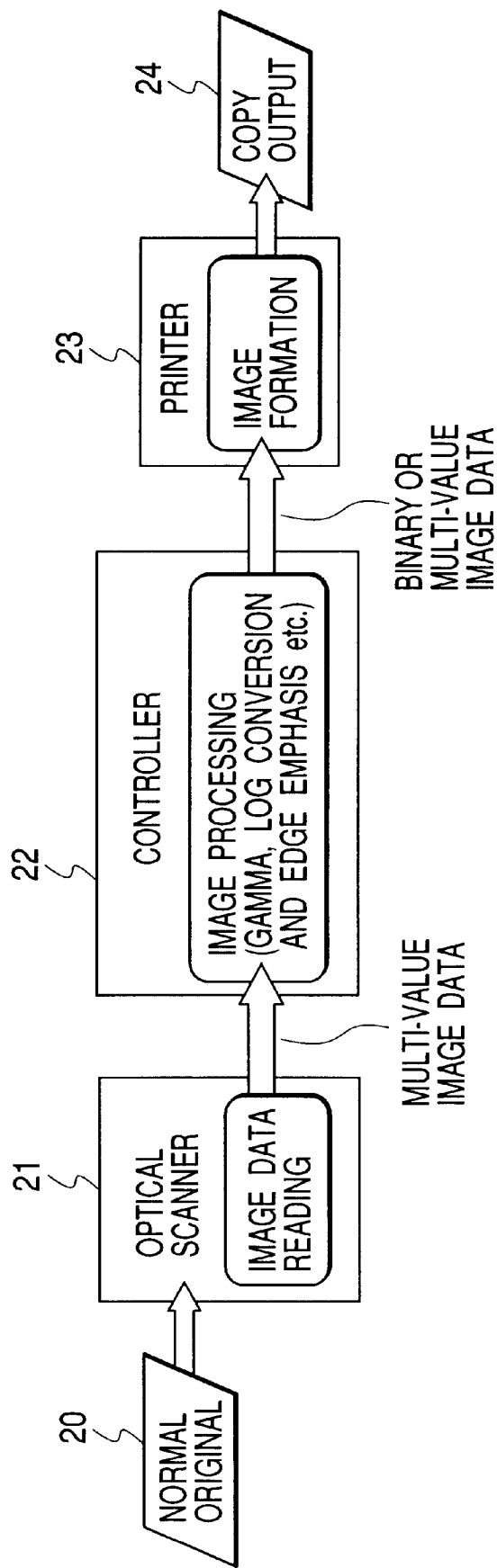
FIG. 15 is a schematic flow diagram illustrating the operation of the image forming apparatus, from reading a normal image original to outputting a copy of the original.

This copier 10 operates as illustrated in FIG. 15 in the ordinary mode. Specifically, the optical scanner built in the scanner 11 reads image data on an original 20 (Step 21). The controller 13 performs image processing of the read image data, such as input masking and black character processing (Step 22). The processed image data is supplied to the printer 12 to form an image on a print sheet (Step 23) and output a copy 24.

Figure 16:
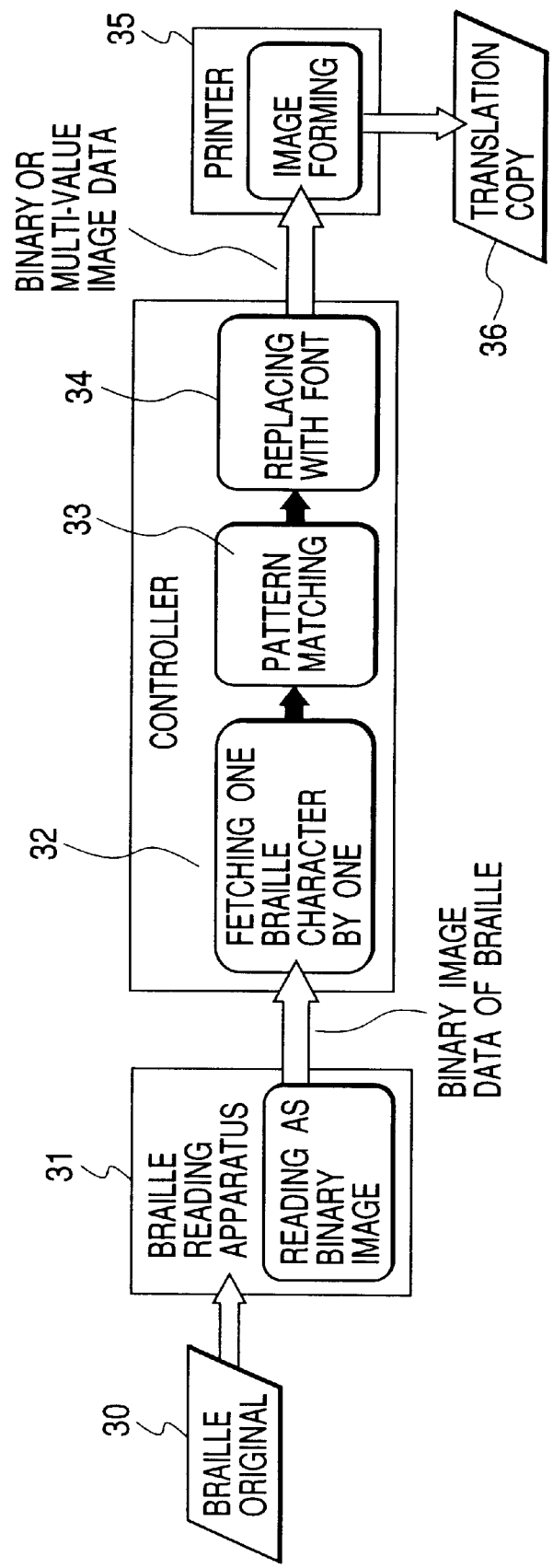
FIG. 16 is a schematic flow diagram illustrating the operation from reading a braille original and to outputting a copy of translation results, according to a fourth embodiment of the invention.

As a user switches the operation mode to the braille mode by using the operation unit 16, the operation illustrated in FIG. 16 is performed. Specifically, an input apparatus is switched from the optical scanner to the irregularly raised pattern reading apparatus 15 to convert a braille original 30 into image data and read it as a binary image (Step 31). Each braille character is fetched (Step 32) to recognize it through pattern matching (Step 33), and thereafter each read braille character is replaced by an image of a normal character having generally the same size, by using a font (Step 34). An image constituted of a normal character is supplied to the printer 12 which prints it on a recording sheet (Step 35) to thereby form a translated image copy 36. In the above manner, a braille character is translated into an ordinary character image which can be read by novices of braille characters.

Figure 17:
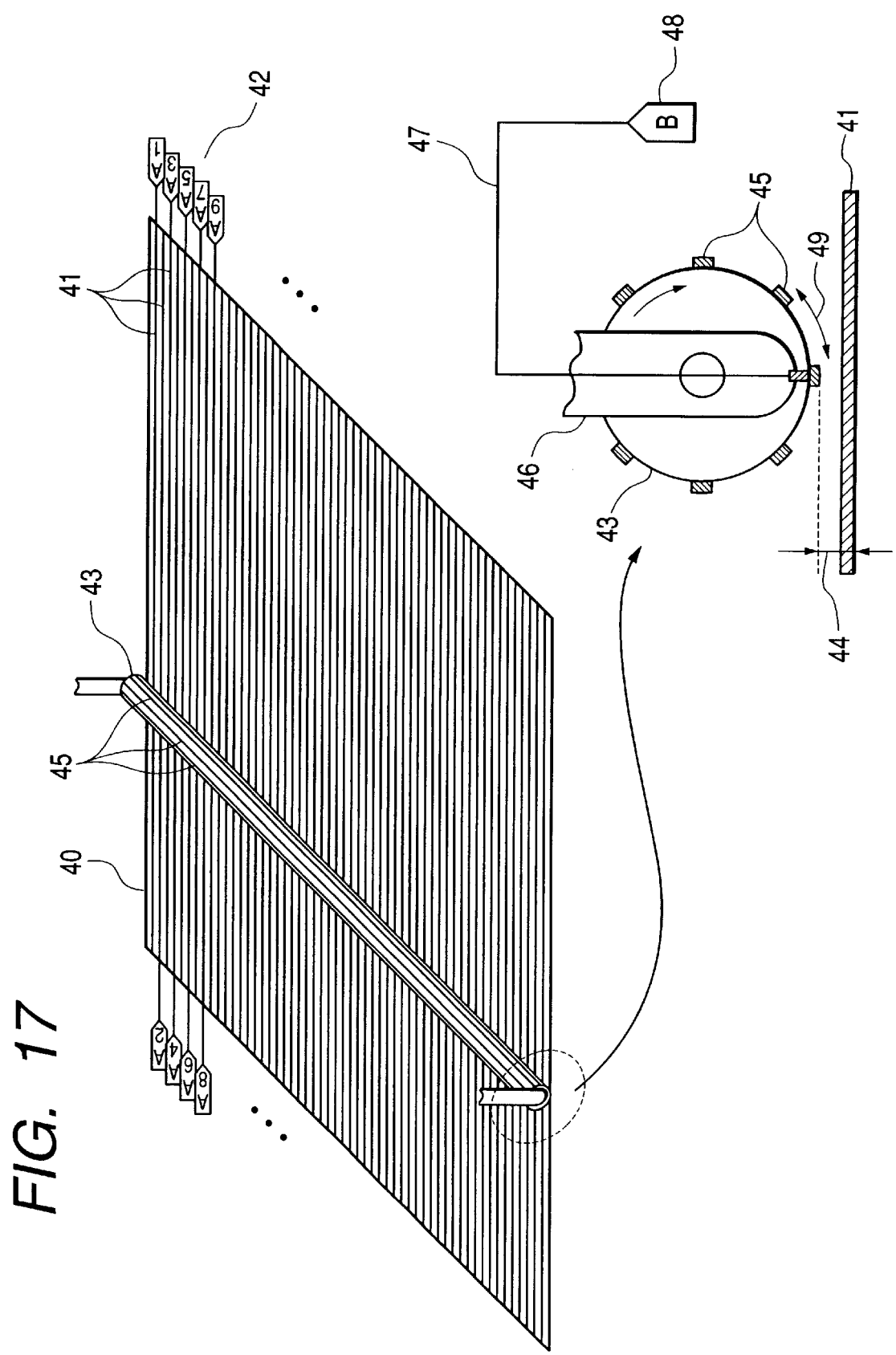
FIG. 17 is a schematic diagram showing the structure of an irregularly raised pattern reading apparatus of the fourth embodiment.

FIG. 17 shows the structure of the irregularly raised pattern reading apparatus 15 used with the copier of this embodiment.

As shown in FIG. 17, a press sheet 40 made of flexible material is used for pressing an original and is fixed at its four sides with a housing of the original cover 14. The press sheet 40 has a number of fine stripe conductors 41 (conductors A) disposed in parallel. Each conductor A 41 has terminals 42 which are represented by A1, A1, A3, . . . , starting from the deepest ones.

Also shown in FIG. 17, a rod-like roller 43 is placed on the press sheet 40, with its axis being perpendicular to the conductor A 41. The roller 43 is rotatively supported by bearings 46. In the normal state, there is a small clearance 44 between the roller 43 and sheet 40. Eight fine stripe conductors 45 (referred to as a conductor B) are formed on the circular surface of the roller 43 and are disposed at an equal pitch along the circumferential direction of the roller 43. A conductive wire 47 is inserted into the bearing 46 of the roller 43, one end of the wire being adapted to be made in contact with each of the conductors B 45 and the other end being connected to one terminal B 48.

The operation of the irregularly raised pattern reading apparatus will be described.

The roller 43 is moved to the right and left by a drive mechanism constituted of an unrepresented motor and the like, and as the roller 43 is moved, the surface of the roller 43 near at the conductor A 41 rotates in a direction opposite to the motion of the roller 43. For example, assuming that the roller 43 moves to the right as viewed in FIG. 17, it rotates in the right direction (clockwise direction). At the start of reading a braille original, the roller 43 is at the leftmost position of the sheet 40. In this state, one of the conductor B 45 is in contact with the terminal B 48. As the read operation starts, the roller 43 moves to the right and rotates in the right direction. As the roller 43 moves to the right by a distance 49 between two conductors B 45, the next conductor B 45 becomes in contact with the conductor B 48. Namely, as the roller 43 moves, the conductor B 45 becomes in contact with each of the conductor B 48 at an interval of the distance 49, thus defining coordinate values which are represented by B1, B2, B3, . . . , starting from the leftmost side of the sheet 40.

Figure 18:
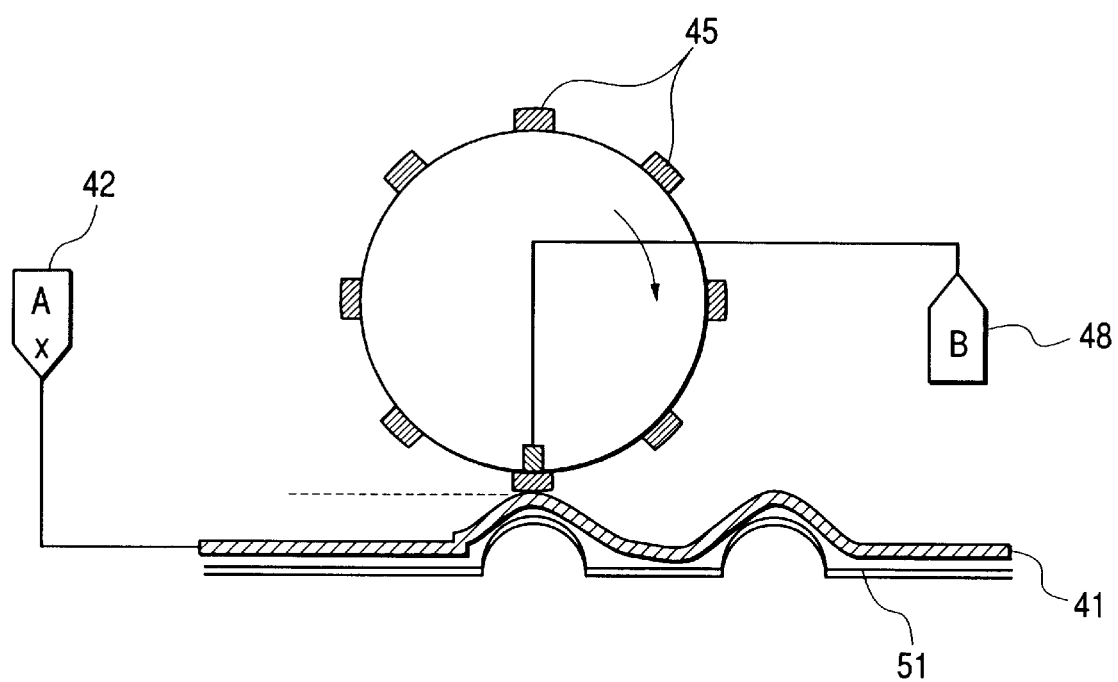
FIG. 18 is a diagram illustrating the operation of detecting a raised portion by the irregularly raised pattern reading apparatus of the fourth embodiment.

As shown in FIG. 18, as a braille original 51 is set, the conductor A 41 on the sheet 40 is lifted by a raised braille character. Since the sheet 40 and conductors 41 are sufficiently flexible and deformed, only a raised portion of a braille original is lifted, and a recess portion is maintained unlifted.

The conductor A 41 lifted by the raised portion becomes in contact with the lowest conductor B 45 of the roller 43. In this case, the terminal A 42 connected to the lifted conductor A 41 is electrically connected to the terminal B 48, it is possible to detect that a raised portion is present at the coordinate point of the original corresponding to the cross point between the conductors B 45 and A 42.

As the roller 43 is scanned from the leftmost to the rightmost, raised portions of the original can be identified as indicated by black points in FIG. 19. Assuming that the positions B1, B2, B3, . . . are x-coordinate values, and the positions A1, A2, A3, . . . are y-coordinate values, the black points shown in FIG. 19 correspond to on-pixels of a binary image. In the above manner, a braille original is read and a binary image process is performed. As above, the structure of this embodiment is substantially the same as a number of switches disposed at coordinate points of the x- and y-coordinate system.

Figure 20A:
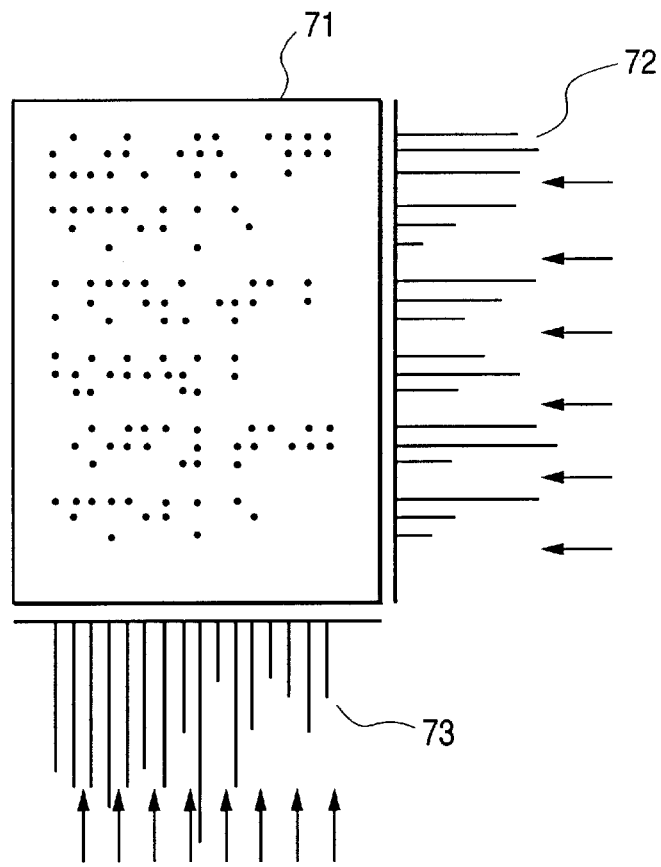
FIGS. 20A and 20B illustrate an operation of fetching one braille character.

Next, a process of fetching each braille character from the binary image of braille original data will be described. Reference numeral 71 in FIG. 20A represents a binary image of a braille original. In this embodiment, the braille original is assumed as having each braille character composed of a matrix like that formed by a braille typewriter or the like.

First, two histograms 72 and 73 of the binary image 71 of the braille original are formed in both the vertical and horizontal directions. The horizontal histogram 72 is formed simply by counting the number of dots present on each horizontal line along the y-coordinate axis, and the vertical histogram 73 is formed simply by counting the number of dots present on each vertical line along the x-coordinate axis.

As shown in FIG. 20A, these histograms are constituted of several columns regularly divided. If these columns are not regularly divided, it means that the original placed obliquely was scanned. In such a case, it is necessary to perform a pre-process of distortion correction.

Figure 20B:
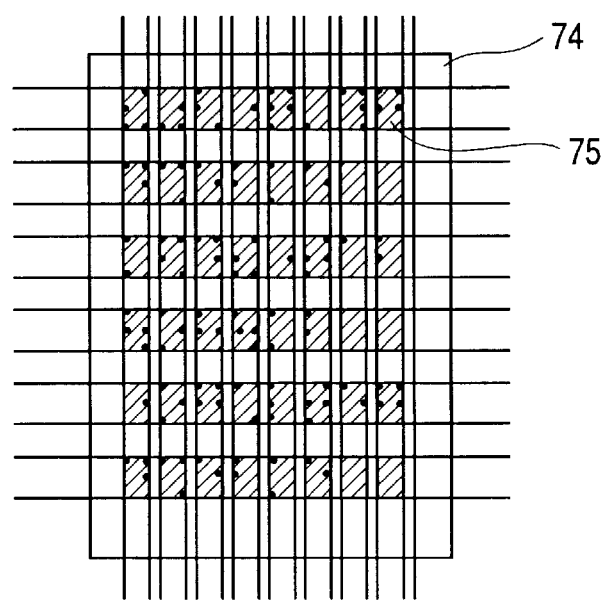

After the histograms are formed, first the vertical histogram 73 is utilized to determine a width of one character. With this process, partition lines are drawn for each combination of two columns of the histogram 73. Similarly, the horizontal histogram 72 is utilized to draw partition lines for each combination of three columns. The resultant partition lines are drawn on an area 74 shown in FIG. 20B. Each rectangle 75 indicated by hatching represents one braille character.

Figure 21:
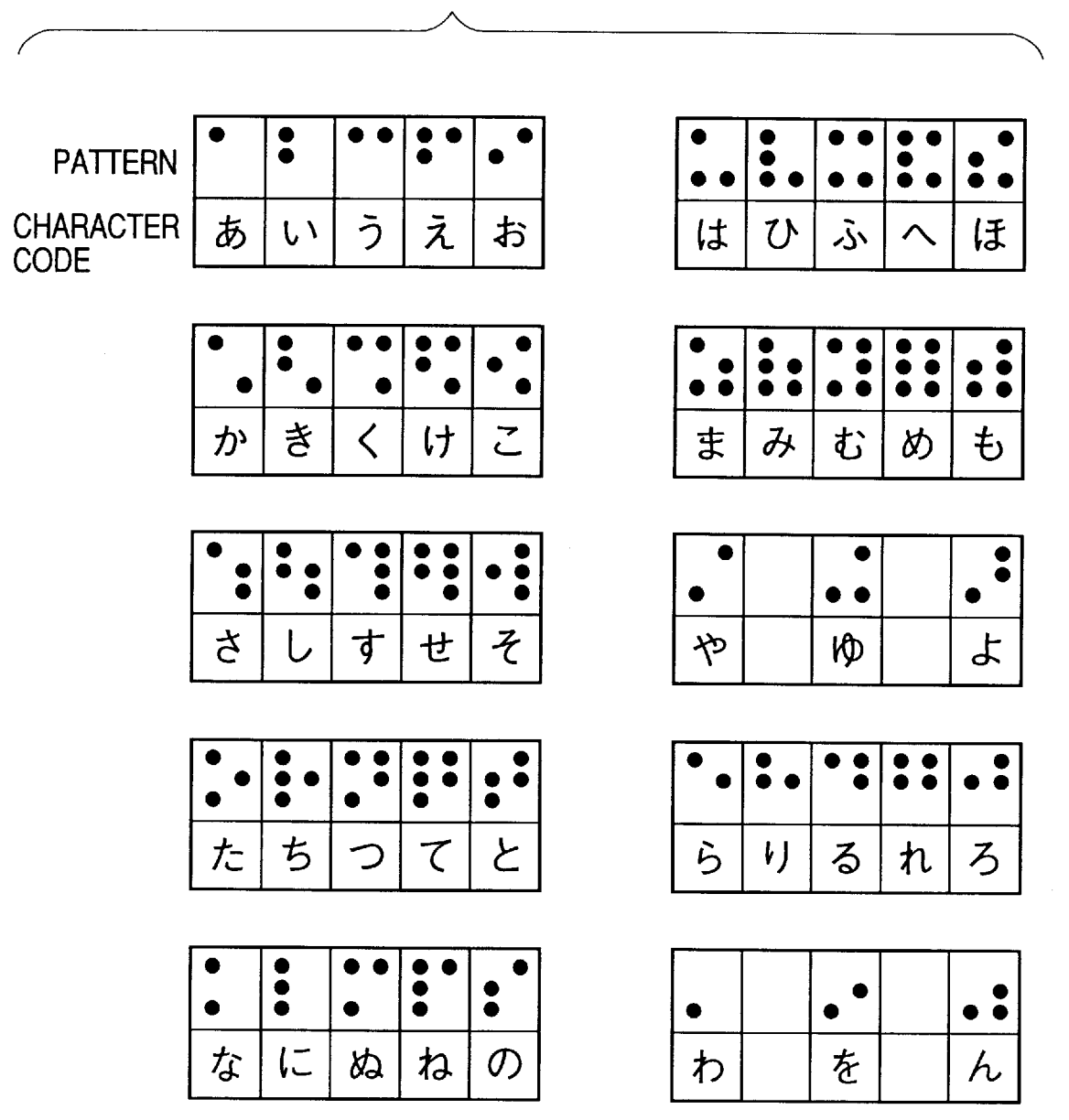

By using a reference shown in FIG. 21 stored in the memory of the controller 13, a pattern in each rectangle of the braille original is converted into an ordinary character code, through pattern matching. For this pattern matching, the reference is enlarged or reduced so as to make it match the size of each braille character in each rectangle 75 shown in FIG. 20B, and thereafter the sum of matched points is compared with a proper threshold value to identify the character code.

After the character code to be converted is identified, each braille character in the original 71 is replaced by an image of a character font, by using fonts stored in the controller 13. This operation is performed so as to replace each braille character by a font having a proper size by referring to the size of the fetched rectangle 75.

Figure 22A:
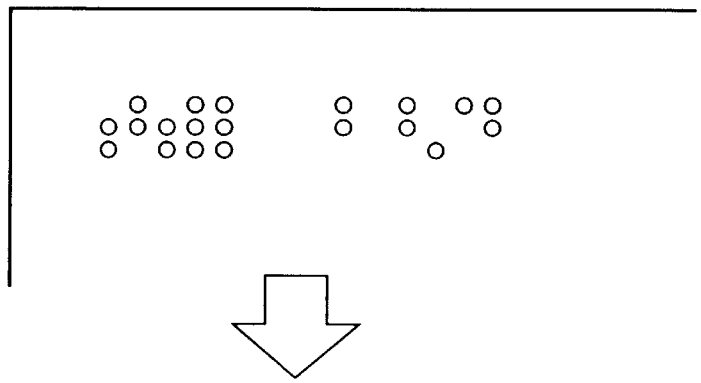
FIGS. 22A and 22B are diagrams illustrating how braille characters are translated.
Figure 22B:
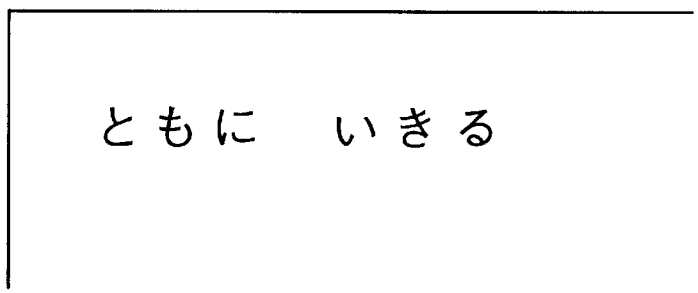

An image constituted of ordinary characters is sent to the printer 12 and an image is formed on a print sheet to terminate the above processes. An example of an image after the translation process is shown in FIG. 22B. In this embodiment, for each braille character of the original shown in FIG. 22A, a corresponding normal character is printed at the same position as the braille character.

The irregularly raised pattern reading apparatus of this embodiment or the fifth to eighth embodiments to be later described, can read a geometrical figure constituted of three-dimensional lines 161 and having a semi-circular cross section 162. For example, such three-dimensional lines are used for forming a map for blind person, with solid lines, dot/solid lines, dot lines, broken lines, and dot/broken lines.

With the apparatus, the read three-dimensional lines are converted into an image as shown in FIG. 29B and printed on a print sheet. In this case, after an irregularly raised original is read as a binary image and the controller 13 judges that the read binary image is not an image of braille letters, the binary image is directly supplied to the printer 12 without performing a process of replacing braille characters by character fonts.

Figure 23:
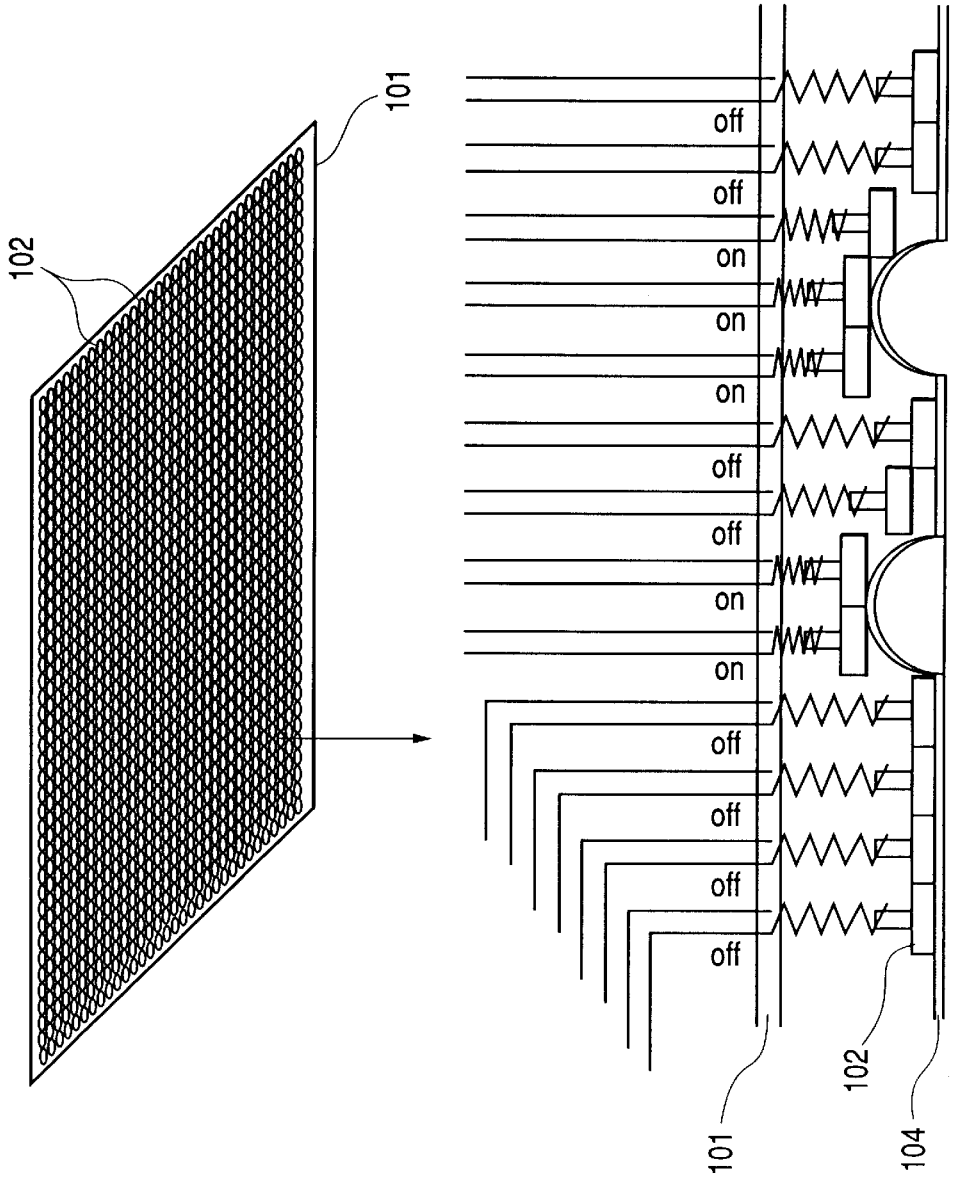
FIG. 23 is a diagram showing the structure of an irregularly raised pattern reading apparatus according to a fifth embodiment of the invention.

An irregularly raised pattern reading apparatus according to the fifth embodiment of the invention has the structure shown in FIG. 23.

In this embodiment, a number of small switches 102 are disposed in a matrix shape on a plane 101 of the original cover 12 shown in FIG. 14 on the side in contact with an original.

In the braille mode, similar to the fourth embodiment, a braille original 104 is placed with its braille surface being directed upward. At the raised portion of a braille character, the switch 102 is depressed against the force of a spring 103, and the coordinate point of the turned-on switch 102 corresponds to an on-pixel. In this manner, the braille original can be converted into a binary image, similar to the fourth embodiment. The process after the binary image is obtained is similar to the fourth embodiment. In this manner, a copy of normal characters translated from braille characters or a copy of an image converted from three-dimensional lines can be obtained as final outputs.

In reading a normal original, it is placed with its image surface downward to read the image information with an optical scanner under the original glass mount 17. In this case, the spring 103 of each switch 102 functions to press the original.

According to the fifth embodiment, the structure of a roller scan as in the fourth embodiment can be omitted, and the whole surface of an original can be read at once so that a read speed can be increased. Conversely, the fourth embodiment can omit a number of conductive wires for interconnecting a number of switches 102 of the fifth embodiment.

Figure 24:
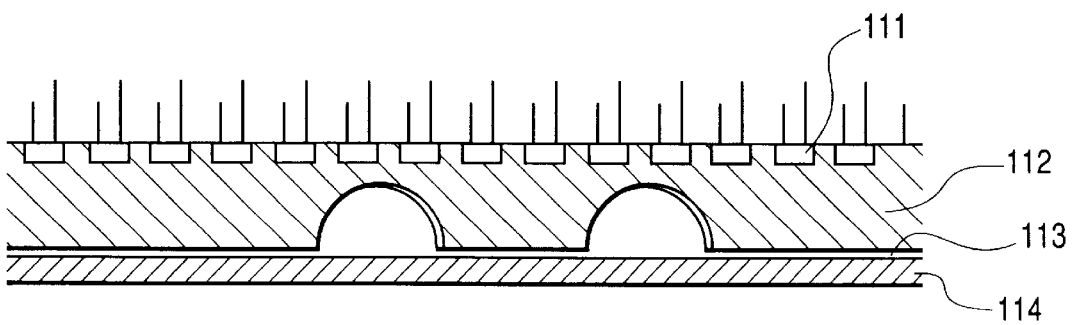
FIG. 24 is a diagram showing the structure of an irregularly raised pattern reading apparatus according to a sixth embodiment of the invention.

An irregularly raised pattern reading apparatus according to the sixth embodiment of the invention has the structure shown in FIG. 24.

An original press sheet 112 on the bottom of the original cover 14 is made of elastic material having some thickness, and a number of pressure sensors 111 are disposed in a matrix shape on this original press sheet 112 similar to the switches of the fifth embodiment.

A braille original is placed on the original glass mount 114 with its braille surface being directed upward, and is fixed with the original press sheet 112. At the raised portion of the braille original, the original press sheet is deformed upward convex, and the pressure sensor 111 above the upward convex portion is applied with a stronger pressure than other nearby sensors and a larger output is obtained.

According to the sixth embodiment, the higher the raised portion, the stronger the pressure is applied to the sensor. It is therefore possible to read a braille original as a multi-value image converted from multi-value outputs. Since a multi-value image can be read, the application field of this reading apparatus becomes broader so that an original of a geometrical figure drawn with three-dimensional lines representative of several different heights can be read and changed to an image.

Figure 25:
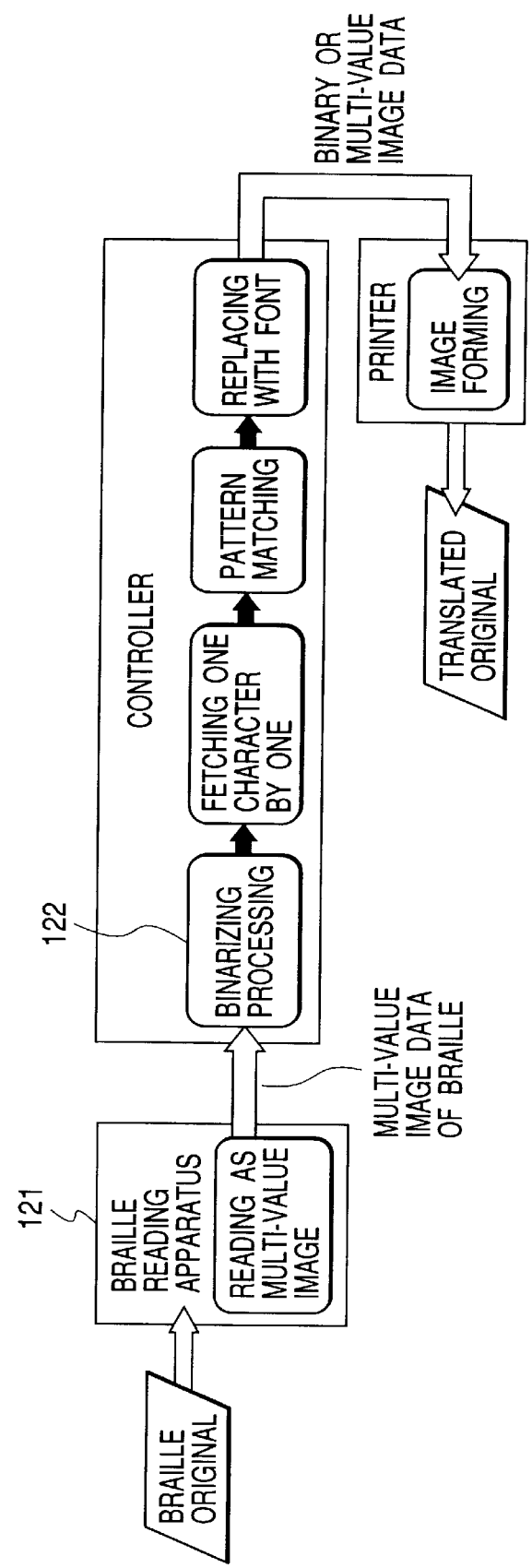
FIG. 25 is a schematic flow diagram illustrating the operation of the irregularly raised pattern reading apparatus of the sixth embodiment, from reading braille characters to forming an image of translation results.

As shown in FIG. 25, in translating braille characters, an original read as a multi-value image with the braille reading apparatus 121 is binarized (Step 122) before fetching each character, and thereafter operations similar to the fourth embodiment are performed.

Figure 26A:
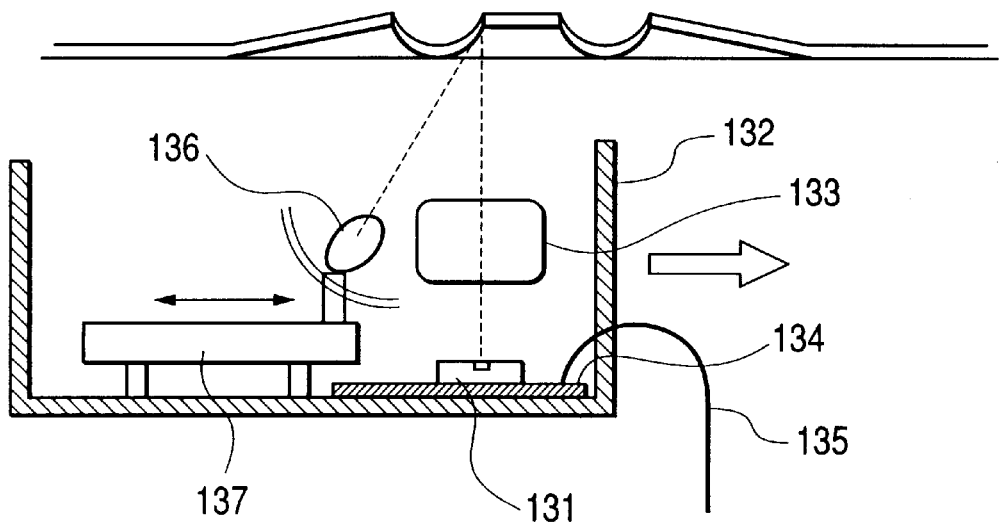
FIGS. 26A and 26B show the structure of an irregularly raised pattern reading apparatus according to a seventh embodiment of the invention.
Figure 26B:
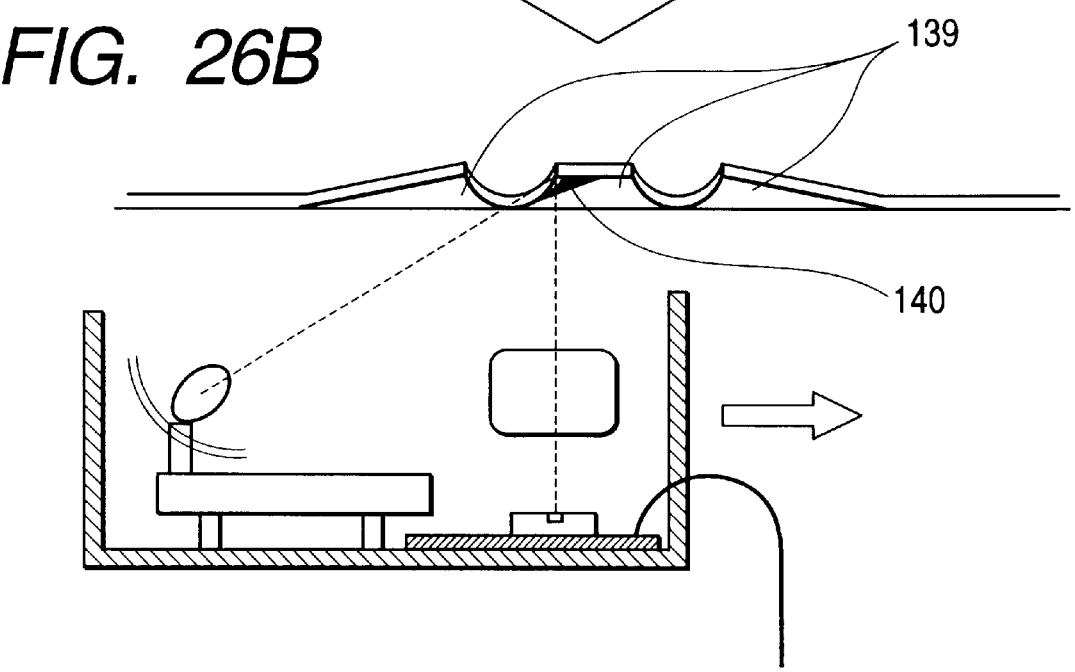

An irregularly raised pattern reading apparatus of the seventh embodiment of the invention has the structure shown in FIGS. 26A and 26B which is an improved version of the original reading apparatus of the optical type for reading a normal original.

Referring to FIG. 26A, mounted on a carriage 132 of an image pickup sensor 131 are a lens 1 for focussing light on an original and a lamp 136 for applying light to the original. The sensor 131 is fixed to a sensor board 134 and a signal picked up with the sensor 131 is supplied to the control unit 13 via a cable 135.

This lamp 136 can be moved on a rail 137 by an unshown mechanism between the position near to the sensor 131 and the position far from the sensor 131 as indicated by a double-arrow.

In the normal mode for reading an image original, the lamp 136 is set as near as possible to the sensor 131 as shown in FIG. 26A so that a shade is hard to be produced by a step portion if it is not so high, the step portion being formed by attaching a sheet of paper on the original.

As the mode is switched to the braille mode, the lamp 136 is moved to the position far from the sensor as shown in FIG. 26B. Since the light source is remote from the position where the original is read and becomes approximately horizontal to the original, a shade 140 is likely to be produced by a step portion even if it is not so high.

As shown in FIG. 26B, a gap 139 is formed between the original glass mount 17 and the braille original. The lens 133 becomes out of focus in the area where the original is lifted, and therefore the read image becomes slightly black in this area. However, it does not become too dense because the degree of the focus shift caused by a braille character is not great. A shadow region 140 is lifted and is far more black than the region where light is applied.

A multi-value image of the read braille original is subjected simply to a threshold comparison by the control unit 13 so that a binary image having black shadows as shown in FIG. 27B can be formed.

This binary image is matched with a braille reference like that shown in FIG. 21 constituted of shadow patterns so that the original can be translated in the manner like that illustrated in FIG. 16.

An irregularly raised pattern reading apparatus according to the eighth embodiment of the invention has the structure shown in FIG. 28 modified from that shown in FIGS. 26A and 26B.

Two lamps 151 and 152 are fixedly mounted on a carriage 132. In the normal mode, the lamp 151 near the sensor 131 is turned on to read an original, and in the braille mode, the lamp 152 remote from the sensor 131 is turned on to read an original.

In this embodiment, the lamp transport mechanism can be omitted so that the mode switching can be performed faster. Reading braille characters and translating them are quite the same as the seventh embodiment.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:

an illuminating unit adapted to illuminate an original recorded with an image in a plurality of predetermined directions;

a reading unit adapted to optically read the illuminated original; and a control unit adapted to control said reading unit to read the original a plurality of times while changing an illumination direction of said illuminating unit in accordance with a sequential number of a reading order to acquire information of shades produced by illuminating a patch on the original with said illuminating unit, and to control said illuminating unit so as to increase an illumination light amount in accordance with the acquired information so that the shades are not produced upon illumination of the patch in a case where said reading unit further reads the original.

2. An image reading apparatus according to claim 1, wherein said control unit controls said illuminating unit to illuminate the original in one of said plurality of predetermined directions at reading of one sequential number of the reading order, and to illuminate the original along another direction at reading of another sequential number of the reading order.

3. An image reading apparatus according to claim 1, wherein said control unit controls said illuminating unit to illuminate the original in one of said plurality of predetermined directions at reading of one sequential number of the reading order, and to illuminate the original along a plurality of directions including the one direction at reading of another sequential number of the reading order.

4. An image reading method comprising:

an illuminating step of illuminating an original recorded with an image in a plurality of predetermined directions;

a reading step of optically reading the illuminated original; and a controlling step of controlling said reading step to read the original a plurality of times while changing an illumination direction of said illuminating step in accordance with a sequential number of a reading order to acquire information of shades produced by illuminating a patch on the original with said illuminating unit, and controlling said illuminating step so as to increase an illumination light amount in accordance with the acquired information so that the shades are not produced upon illumination of the patch in a case where the original is further read.

5. An image reading method according to claim 4, wherein said controlling step controls said illuminating step to illuminate the original in one of said plurality of predetermined directions at reading of one sequential number of the reading order, and to illuminate the original along another direction at reading of another sequential number of the reading order.

6. An image reading method according to claim 4, wherein said controlling step controls said illuminating step to illuminate the original in one of said plurality of predetermined directions at reading of one sequential number of the reading order, and to illuminate the original along a plurality of directions including the one direction at reading of another sequential number of the reading order.

7. A storage medium for computer-readably storing a program for executing an image reading method, said program comprising:

an illuminating step of illuminating an original recorded with an image in a plurality of predetermined directions;

a reading step of optically reading the illuminated original; and a controlling step of controlling said reading step to read the original a plurality of times while changing an illumination direction of said illuminating step in accordance with a sequential number of a reading order to acquire information of shades produced by illuminating a patch on the original with said illuminating unit, and controlling said illuminating step so as to increase an illumination light amount in accordance with the acquired information so that the shades are not produced upon illumination of the patch in a case where the original is further read.

8. A storage medium according to claim 7, wherein said controlling step controls said illuminating step to illuminate the original in one of said plurality of predetermined directions at reading of one sequential number of the reading order, and to illuminate the original along another direction at reading of another sequential number of the reading order.

9. A storage medium according to claim 7, wherein said controlling step controls said illuminating step to illuminate the original in one of said plurality of predetermined directions at reading of one sequential number of the reading order, and to illuminate the original along a plurality of directions including the one direction at reading of another sequential number of the reading order.

* * * * *